United States Patent

Marsh et al.

[11] 4,039,907
[45] Aug. 2, 1977

[54] THRUST CONTROL CIRCUIT

[75] Inventors: Arthur H. Marsh, Arvada; Prabodh Chandra Gupta, Aurora, both of Colo.

[73] Assignee: Otis Elevator Company, New York, N.Y.

[21] Appl. No.: 594,827

[22] Filed: July 10, 1975

Related U.S. Application Data

[63] Continuation of Ser. No. 389,767, Aug. 20, 1973, abandoned.

[51] Int. Cl.² .................................................. H02K 41/00
[52] U.S. Cl. .................................. 318/135; 318/227; 318/230; 318/231
[58] Field of Search ............ 318/227, 230, 231, 315, 318/316, 317, 333, 332, 135, 121; 329/177

[56] References Cited

U.S. PATENT DOCUMENTS

| | | | |
|---|---|---|---|
| 3,387,197 | 6/1968 | Paulus | 318/230 X |
| 3,441,823 | 4/1969 | Schlabach | 318/227 |
| 3,525,100 | 8/1970 | Duff | 318/227 |
| 3,549,966 | 12/1970 | Wilson | 318/135 |
| 3,611,089 | 10/1971 | Mokrytzki | 318/227 |
| 3,619,749 | 11/1971 | Schieman | 318/231 |
| 3,619,750 | 11/1971 | Mokrytzki | 318/231 |
| 3,719,869 | 3/1973 | Coho | 318/135 |
| 3,735,219 | 5/1973 | Kahn et al. | 318/135 |
| 3,775,652 | 11/1973 | Bowler et al. | 318/227 |

*Primary Examiner*—Donovan F. Duggan
*Attorney, Agent, or Firm*—Robert T. Mayer

[57] ABSTRACT

A control circuit is provided for a linear induction motor to control motor thrust in relation to a reference thrust. An analog circuit, or computer, is supplied signals representative of the voltage and current to the motor. This analog circuit includes circuit elements simulating the stator or primary resistance of the motor, and it develops a control signal proportional to the power delivered to the motor less the copper losses in the primary resistance. This control signal is proportional to motor thrust if magnetizing losses and secondary resistance losses are ignored. A reference thrust signal is compared with this control signal, and the error between these two signals is used to control the firing angles of controlled rectifiers in a controlled rectifier bridge network supplying power to the motor. By this control loop the power supplied to the motor is regulated to control the thrust instantaneously developed in relation to a reference thrust.

8 Claims, 4 Drawing Figures

THRUST CONTROL CIRCUIT

This is a continuation of application Ser. No. 389,767, filed Aug. 20, 1973, now abandoned.

BACKGROUND OF THE INVENTION

1. Field of the Invention

This invention relates to a circuit for computing and controlling the power supplied to an alternating current motor especially suited for use with an alternating current linear induction motor.

2. Description of the Prior Art

The motor control art is quite advanced in certain of its aspects. Controlled rectifier bridges are well-known and understood for motor control applications. Trigger logic required in conjunction with such controlled rectifier bridges is also highly developed. It is commonplace to provide controlled slip operation of an induction motor, using generally known trigger logic circuit designs to gate controlled rectifiers in a controlled rectifier bridge to supply variable voltage-variable frequency power to the motor. It is likewise within the state of the art to develop continuously varying reference control signals correlated with the operating frequency of the controlled rectifier bridge. Providing specific circuits to achieve these control functions and related motor control functions is readily within the skill of the motor circuit designer, so too for the broad circuit design requirements of closed loop control systems using these various circuits.

Techniques are known in the prior art for regulating the frequency and voltage of a controlled rectifier bridge supplying an alternating current motor to provide motor control in relation to speed, torque and other motor operating parameters. Central to these prior art motor control systems is a mechanical, or electromechanical, measurement of the operating parameter providing the basis for control. For example, to control applied power in relation to motor speed, a mechanical, or electro-mechanical, tachometer is normally used to monitor motor speed. Similarly, when torque is the pertienent control parameter, sensing devices, such as strain gauges, are required to monitor motor operation.

SUMMARY OF THE INVENTION

The present invention, like the prior art, uses a controlled rectifier bridge to supply power to an alternating current motor. The point of departure from the prior art is in the measurement of the motor parameter upon which motor control is based. In the instant invention an analog circuit, or computer, is used to develop a control signal which is substantially proportional to the output power of the motor. Such a direct electrical measurement of output power is particularly suited for use in controlling the power to a linear induction motor in relation to the thrust developed by the motor. Unlike conventional rotating machines, a linear induction motor does not have an available output shaft from which a "torque" (thrust) reading can be taken. Normally, to measure the thrust of such a motor, it is necessary to measure speed and acceleration and use these parameters to complete a relatively complex calculation of power. The present invention, however, provides an extremely simple and useful alternative for determining power or thrust by direct electrical computation.

Using the present invention, the power to a linear induction motor can be regulated to control the instantaneous thrust developed by the motor in relation to a reference thrust. An analog circuit, or computer, including elements simulating the stator or primary resistance of the motor, is supplied signals representative of the voltage and current supplied to the motor. The motor voltage and motor current are processed by the analog circuit to develop a control signal proportional to the power delivered to the motor less the copper losses in the primary resistance of the motor. This control signal is proportional to motor thrust, if magnetizing losses and secondary resistance losses are ignored. A reference thrust signal is compared with this control signal, and the error between these two signals is used to control the firing angles of controlled rectifiers in a controlled rectifier bridge network supplying power to the motor. Thus the power supplied to the motor is regulated to control the thrust instantaneously developed in relation to reference thrust.

DESCRIPTION OF THE DRAWINGS

The instant invention can be best understood by reference to the following description of a preferred embodiment taken in conjunction with the accompanying drawings in which.

DESCRIPTION OF THE PREFERRED EMBODIMENT

Figure 1:
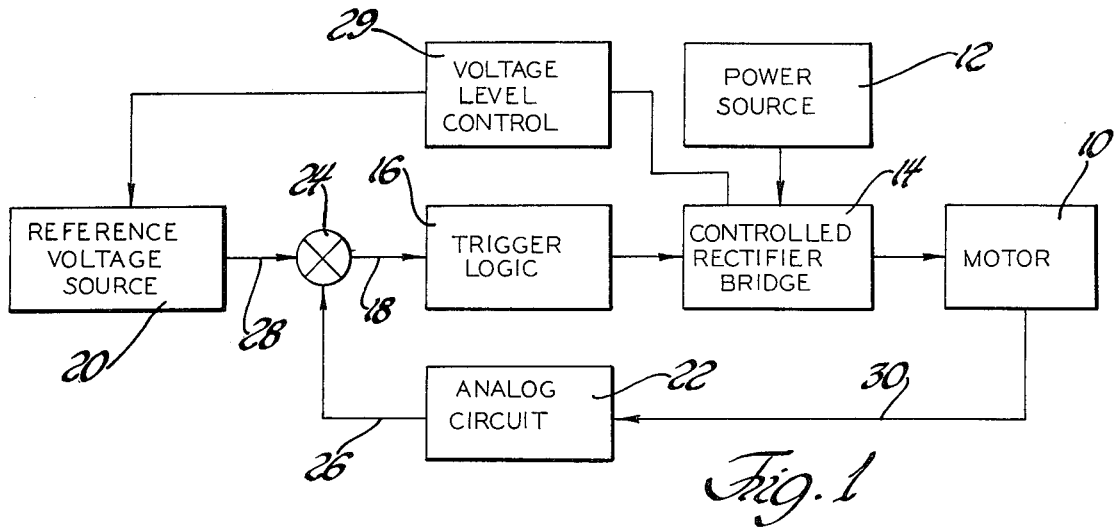
FIG. 1 is a block diagram circuit schematic of the power control system of the present invention.

Reference should now be made to the drawings and more particularly to the block diagram circuit schematic of FIG. 1. This circuit provides closed loop control of the power supplied to a motor load 10. The motor 10 is an alternating current motor taking the form of a three-phase linear induction motor in the preferred embodiment. A power source 12 supplies power to the motor 10 through a controlled rectifier bridge 14. A variety of direct current and alternating current sources could be used as the power source 12, but in the preferred embodiment the power source 12 takes the form of a conventional, commercially available three-phase source of power. The bridge 14 can likewise take a variety of known forms; however, in the preferred embodiment the bridge 14 comprises a three-phase controlled rectifier bridge using silicon controlled rectifiers as switching elements. To regulate the power to the motor 10, the controlled rectifiers in the bridge 14 are sequentially and periodically gated conductive by a conventional trigger logic 16. The firing angles of trigger signals from the trigger logic 16 are regulated by a signal on a line 18 in a manner well known in the art. The signal on line 18, in turn, is proportional to the difference between a reference signal provided by an electrical source shown as a reference voltage source 20 and a control signal proportional to the power delivered to the load less the copper losses in the stator or primary of the motor 10 which control signal is developed by an electrical monitoring means comprising an analog circuit 22. The control signal from the analog circuit 22 is applied to a summer 24 on a connecting line 26; similarly, the reference signal from the reference voltage source 20 is applied to the summer on a connecting line 28.

It should be understood that the motor 10 could be a multispeed motor and that the reference voltage source 20 could provide a variable reference signal adapted to be correlated with the selected operating speed of the motor. Further, the bridge 14 and the trigger logic 16 could provide variable voltage-variable frequency power to the motor 10. If the supply to the motor 10 were selected to be such a variable voltage-variable frequency supply, the reference voltage source 20 could be designed to provide a variable level reference signal adpted to be correlated with the synchronous operating speed of the motor 10. If such a supply were used, means comprising a voltage level control 29 would be required to automatically correlate the voltage of the source 20 with the operation of the bridge 14. This means 29 would interconnect the source 20 and the bridge 14 as shown. All of these variations are within the skill of the art, and none is explained here in detail. As a further point, it is to be understood that the control of FIG. 1 could be calibrated to effect regulation in terms of powder, thrust or any other proportional motor parameter.

Both the current and the voltage applied to the motor 10 are sensed and supplied to the analog circuit 22 on the line 30. The analog circuit 22 processes the motor voltage and motor current to develop the control signal on line 26 which, as noted, is proportional to the power delivered to the motor 10 less the copper losses in the primary of the motor 10. The operation of the analog circuit 22 is best understood with referenceto FIGS. 2, 3, and 4.

Figure 2:
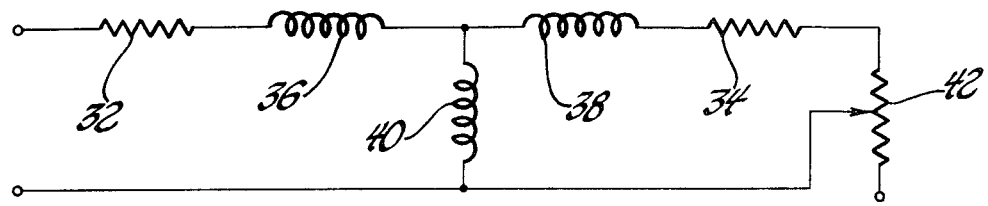
FIG. 2 is a schematic representation of an equivalent circuit for an induction motor.

FIG. 2 is a circuit schematic for an induction motor under balanced steady state conditions. A resistor 32 represents the stator phase resistance, and a resistor 34 represents the rotor phase resistance. An inductive reactance 36 represents the stator leakage reactance; an inductive reactance 38 represents the rotor leakage reactance; and an inductance reactance 40 represents the magnetizing reactance of the motor. Each resistor and each reactance is, of course, a per phase element. The resistance 42 represents the internal mechanical power per stator phase. The value of the resistance 42 is $(1-s)/s$ times the value of the resistor 34. This induction motor equivalent circuit is the well-accepted, textbook equivalent for induction machines.

Figure 3:
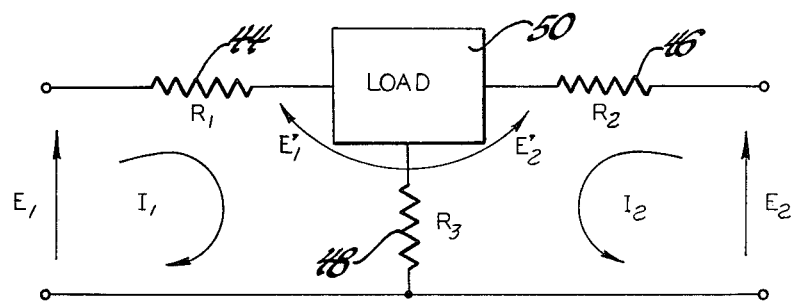
FIG. 3 is a schematic representation of an equivalent circuit for a three-phase motor drawn as a two-port network.
Figure 4:
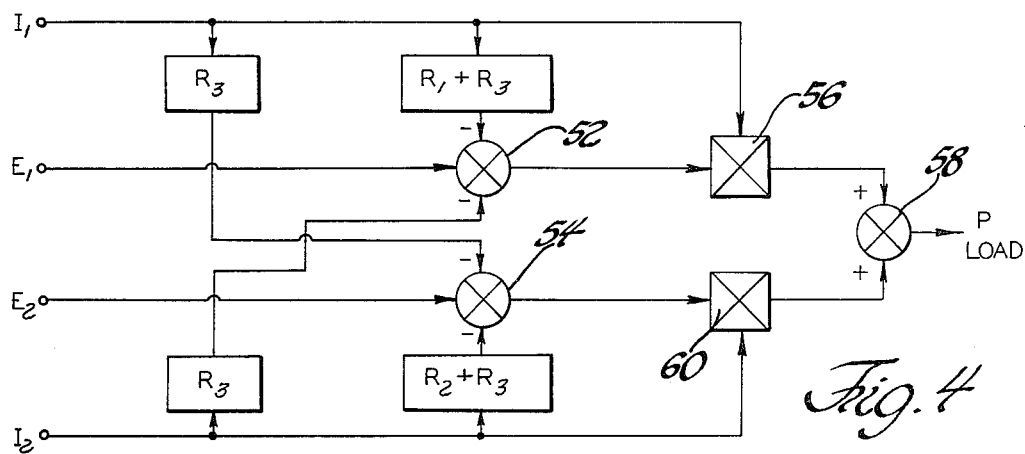
FIG. 4 is a schematic representation of the analog circuit, or computer, used to process motor voltage and motor current in accordance with the present invention.

FIG. 3 shows schematically an equivalent circuit for a three-phase induction motor ignoring magnetizing losses and copper losses in the rotor. This three-phase equivalent is drawn schematically as a two-port network. Three resistors are included in the schematic to represent the three stator resistors of the three-phase motor. These resistors are illustrated as a resistor 44 ($R_1$), a resistor 46 ($R_2$), and a resistor 48 ($R_3$). The block labeled load 50 represents the mechanical power generated by the motor. The two-port network is shown with input voltages $E_1$ and $E_2$ and circulating loop current $I_1$ and $I_2$. The voltage drops across the load 50 resulting from the two circulating loop currents are respectively represented by the potential differences $E_1'$ and $E_2'$ on the schematic. The power delivered to the load 50 can be calculated as follows:

$$P_{load} = E_1'I_1 + E_2'I_2$$

$$P_{load} = [E_1 - I_1R_1 - (I_1 + I_2)R_3]I_1 + [E_2 - I_2R_2 - (I_1 + I_2)R_3]I_2$$

$$P_{load} = [E_1 - I_1(R_1 + R_3) - I_2R_3]I_1 + [E_2 - I_2(R_2 + R_3) - I_1R_3]I_2$$

load power equation in terms of the voltages and currents at the input to the motor equivalent circuit and the stator resistances can be computed with an analog circuit of the type shown schematically in FIG. 4. All that is needed in the circuit are elements to simulate the stator resistances, summers, and multipliers. By applying at the input to the circuit the voltage and current levels supplied to the motor, the mechanical power developed by the motor can be computed. As shown in the schematic the voltages $E_1$ and $E_2$ are applied directly to first and second summers 52 and 54. The current $I_1$ multiplied by the resistance $R_1 + R_3$ is subtracted from the voltage $E_1$ at the summer 52. Similarly, the current $I_2$ multiplied by the resistance $R_3$ is subtracted from the voltage $E_1$ at the summer 52. The resultant from the summer 52 is multiplied by the current $I_1$ by a multiplier 56. The output from the multiplier 56 is applied to a summer 58. Comparing the operations performed in respect of the voltage $E_1$ and the currents $I_1$ and $I_2$ to develop the signal at the output of the multiplier 56 with the first term of the last equation above shows that the first term has been computed in this analog circuit. Similar operations are performed in the processing of the voltage $E_2$ and the currents $I_1$ and $I_2$ to produce the second term of the equation. Accordingly, as noted, the voltage $E_2$ is applied directly to the summer 54. The current $I_2$ multiplied by the resistance $R_2 + R_3$ is subtracted from the voltage $E_2$ at the summer 54 as is the current $I_1$ multiplied by the resistance $R_3$. The resultant from the summer 54 is applied to a multiplier 60 where it is multiplied by the current $I_2$. The output from the multiplier 60 is combined with the output from the multiplier 56 at the summer 58 to yield the computed control signal $P_{load}$.

Significantly, the instant invention provides a signal $P_{load}$ proportional to the load power of the motor by processing the voltage and current input to the motor. This load power signal, as noted above, represents the power input to the motor less the resistance losses in the stator. Magnetizing losses and resistance losses in the rotor are ignored in this processing circuitry.

Various analog arrays can be synthesized to perform the functions shown schematically in FIG. 4. Such circuit design is within the skill of the art, and as it does not form a part of the instant invention, is not here detailed.

Although the foregoing has proceeded in terms of a particular embodiment, it is to be understood that various modifications and changes could be engrafted thereon by one skilled in the art within the spirit and scope of the appended claim.

The embodiments of this invention in which an exclusive property or privilege is claimed are defined as follows:

1. A motor control circuit comprising: an alternating current motor; a source of voltage supplying current and delivering power to said motor; and an electrical monitoring means connected with said motor for developing a control signal proportional to the power delivered to said motor less the stator copper losses of said motor, said electrical monitoring means sensing both the voltage applied to and the current supplied to said motor and using both the sensed voltage and the sensed current to develop said control signal wherein said motor is a three phase linear induction motor and said electrical monitoring means includes first means simulating the sum of the stator resistances of the first and the third of the three stator phase windings of said motor, second means simulating the sum of the stator resistances of the second and the third of said three stator phase windings; and third means simulating the stator resistance of the third of said three stator phase windings.

2. A method for controlling the power supplied to a linear induction motor comprising: sensing the current and voltage applied to said motor; applying the sensed current and sensed voltage to an analog circuit including; first means simulating the sum of the stator resistances of the first and the third of the three stator phase windings of said motor, second means simulating the sum of the stator resistances of the second and the third of said three stator phase windings; and third means simulating the stator resistance of the third of said three stator phase windings; developing a control signal in said analog circuit representative of the power supplied to said motor less the copper losses in the primary of said motor; providing a reference signal proportional to a reference power level; comparing said control signal to said reference signal; and controlling a power controller supplying power to said motor in relation to the difference between said control signal and said reference signal.

3. A motor control circuit according to claim 1, wherein said electrical monitoring means comprises a first summing means producing a first signal representing the voltage applied across said first stator phase winding minus both the product of the current in said second phase winding multiplied by the resistance simulated by said third means and the product of the current in said first stator phase winding multiplied by the resistance simulated by said first means; a first multiplier producing a first component signal representing the product of said first signal multiplied by the current in said first phase winding; a second summing means producing a second signal representing the voltage applied across said second stator phase winding minus both the product of the current in said first stator phase winding multiplied by the resistance simulated by said third means and the product of the current in said second stator phase winding multiplied by the resistance simulated by said second means; a second multiplier producing a second component signal representing the product of said second signal multiplied by the current in said second phase winding; and third summing means producing said control signal by summing said first and second component signals.

4. A motor control system comprising, an alternating current motor; a source of voltage supplying current and delivering power to said motor; an analog circuit connected to said motor; said circuit sensing both the voltage applied to and the current supplied to said motor by said voltage source and in response thereto producing a control signal signifying the power being delivered to said motor by said source less the stator copper losses of said motor; a reference signal source providing a reference signal signifying desired operation of said motor; means providing a signal signifying the difference between said reference signal and said control signal; and means controlling the power delivered by said voltage source according to said difference signal wherein the analog circuit includes first means simulating the sum of the stator resistances of the first and the third of the three stator phase windings of said motor; second means simulating the sum of the stator resistances of the second and the third of said three stator phase windings; and third means simulating the stator resistance of the third of said three stator phase windings.

5. A motor control system according to claim 4, wherein said motor is a linear induction motor.

6. A motor control system according to claim 5, wherein said linear induction motor is a three phase motor.

7. A motor control system according to claim 6, wherein said analog circuit comprises a first summing means producing a first signal representing the voltage applied across said first stator phase winding minus both the product of the current in said second phase winding multiplied by the resistance simulated by said third means and the product of the current in said first stator phase winding multiplied by the resistance simulated by said first means, a first multiplier producing a first component signal representing the product of said first signal multiplied by the current in said first phase winding; a second summing means producing a second signal representing the volume applied across said second stator phase winding minus both the product of the current in said first stator phase winding multiplied by the resistance simulated by said third means and the product of the current in said second stator phase winding multiplied by the resistance simulated by said second means; a second multiplier producing a second component signal representing the product of said second signal multiplied by the current in said second phase winding; and third summing means producing said control signal by summing said first and second component signals.

8. A motor control system according to claim 7, wherein said source of voltage comprises a variable voltage-variable frequency source.

* * * * *

UNITED STATES PATENT OFFICE
CERTIFICATE OF CORRECTION

PATENT NO. : 4,039,907
DATED : August 2, 1977
INVENTOR(S) : ARTHUR H. MARSH and PRABODH CHANDRA GUPTA It is certified that error appears in the above-identified patent and that said Letters Patent are hereby corrected as shown below:

Column 3, Line 16 - "adpted" should read --adapted--

Column 3, Line 43 - "inductance" should read --inductive--

Column 6, Line 38 - "volume" should read --voltage--

Signed and Sealed this

First Day of November 1977

[SEAL]

Attest:

RUTH C. MASON
Attesting Officer

LUTRELLE F. PARKER
Acting Commissioner of Patents and Trademarks